United States Patent
Garces et al.

(10) Patent No.: US 8,406,019 B2
(45) Date of Patent: Mar. 26, 2013

(54) REACTIVE POWER COMPENSATION IN SOLAR POWER SYSTEM

(75) Inventors: Luis Jose Garces, Niskayuna, NY (US); Yan Liu, Ballston Lake, NY (US); Michael deRooij, Schenectady, NY (US); Sumit Bose, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1018 days.

(21) Appl. No.: 12/210,275

(22) Filed: Sep. 15, 2008

(65) Prior Publication Data

US 2010/0067271 A1 Mar. 18, 2010

(51) Int. Cl.
*H02M 7/48* (2007.01)
(52) U.S. Cl. .......................................... 363/71
(58) Field of Classification Search .................. 363/60, 363/71, 127, 131; 323/222, 282, 284, 906; 307/52; 340/635; 700/286
See application file for complete search history.

(56) References Cited

U.S. PATENT DOCUMENTS

| 5,268,832 | A | 12/1993 | Kandatsu |
| 6,281,485 | B1 * | 8/2001 | Siri .............................. 250/203.4 |
| RE38,940 | E * | 1/2006 | Isham et al. ................... 323/224 |
| 7,239,035 | B2 * | 7/2007 | Garces et al. ................... 290/43 |
| 7,508,173 | B2 * | 3/2009 | Zhou et al. ..................... 323/207 |
| 2002/0087234 | A1 | 7/2002 | Lof et al. |
| 2005/0251296 | A1 | 11/2005 | Tracy Nelson et al. |
| 2008/0285317 | A1 * | 11/2008 | Rotzoll ............................ 363/80 |
| 2009/0121549 | A1 * | 5/2009 | Leonard ........................... 307/51 |
| 2009/0319090 | A1 * | 12/2009 | Dillon et al. ................... 700/291 |

FOREIGN PATENT DOCUMENTS

| EP | 1508951 A1 | 2/2005 |
| WO | WO2004027959 A1 | 4/2004 |
| WO | WO2006078288 A2 | 7/2006 |

OTHER PUBLICATIONS

Hcoman Dehbonei; A Combined Voltage Controlled and Current Controlled "Dual Converter" for a Weak Grid Connected Photovoltaic System with Battery Energy Storage; pp. 1495-1500; Australia.

* cited by examiner

*Primary Examiner* — Adolf Berhane
*Assistant Examiner* — Yemane Mehari
(74) *Attorney, Agent, or Firm* — Ann M. Agosti

(57) ABSTRACT

A method of providing reactive power support is proposed. The method includes detecting at least one of a plurality of network parameters in a distributed solar power generation system. The generation system includes a plurality of photovoltaic modules coupled to a grid via inverters. The method further includes sensing a state of the photovoltaic modules coupled to the distributed solar power generation system and determining a reactive power measure based upon the sensed state and the detected network parameters. The reactive power measure is used to generate a reactive power command. The reactive power command is further used to compensate reactive power in the distributed solar power generation system.

20 Claims, 3 Drawing Sheets

REACTIVE POWER COMPENSATION IN SOLAR POWER SYSTEM

BACKGROUND

Embodiments of the invention generally relate to a method and system for compensating reactive power in power systems and in particular, to a method and system for compensating reactive power in solar power generation systems.

Power transmission and distribution grids transmit electrical energy from generating facilities to end users. Voltage management on a transmission and distribution system is one of the factors considered for the stable operation and design of the system. Reactive power flow may be influenced by the generator source, changes in the transmission and distribution system, the addition of shunt reactive elements, and loads, for example.

Reactive power is important from a standpoint of power delivery. In a typical power system reactive power flow has an influence on voltage. Since most transmission systems are inductive, increasing a reactive current component (i.e., capacitive volt-amperes reactive or VARs) will cause the voltage to rise. Conversely, decreasing a reactive power component (i.e., inductive VARs) will cause the voltage to decrease. Furthermore, excessive reactive power flow that causes rises in voltage may put undue stress on transmission lines, transformers and other electrical components.

Reactive power compensation techniques have been addressed by providing VAR support based on real power generation and power factor control. However, VAR support and power factor control has some shortcomings. For example, VAR support increases the reactive power and does not affect the real power. Therefore, total capability of the generators is not utilized since VAR support is proportional to the square of real and reactive power outputs. Further, power factor control may occasionally result in an undesirable action such as introducing capacitance to inherently maintain a desired voltage.

Therefore, there is a need for an enhanced reactive power control to dynamically address fluctuating conditions in power generating systems.

BRIEF DESCRIPTION

A method of providing reactive power support is proposed. The method includes detecting at least one of a plurality of network parameters in a distributed solar power generation system. The generation system includes a plurality of photovoltaic modules coupled to a grid via inverters. The method further includes sensing a state of the photovoltaic modules coupled to the distributed solar power generation system and determining a reactive power measure based upon the sensed state and the detected network parameters. The reactive power measure is used to generate a reactive power command. The reactive power command is further used to compensate reactive power in the distributed solar power generation system.

In one embodiment, a system having a plurality of photovoltaic modules coupled to a grid is proposed. The system includes at least one inverter coupled with the respective photovoltaic modules. A plurality of sensing devices are coupled to the grid and configured to sense at least one network parameter and a reactive power measure. The system further includes an optimization controller coupled to the at least one inverter and configured to generate a reactive power command. The reactive power command is used for compensating reactive power in the distributed solar power generation system based upon the at least one network parameter and a sensed state.

In one embodiment of the invention, an apparatus for optimizing reactive power compensation is proposed. The apparatus includes a receiver configured to receive a plurality of network parameters and a status of inverters coupled to a photovoltaic module in a distributed solar power generation system coupled to a grid. A memory is coupled to the receiver to store the plurality of network parameters and the status. At least one processor is coupled to the receiver and configured to compute a reactive power measure for distributed solar power generation system based upon the network parameters and the status. The processor is configured to generate a reactive power command based upon the reactive power measure. The apparatus further includes a transmitter coupled to the processor and configured to transmit the reactive power command to the inverters to compensate reactive power in the distributed solar power generation system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other.

Distributed power generators are usually small, modular electricity generators sited close to the customer load. Such distributed power generators offer advantages that typical large-scale, capital-intensive, central-station power plants and distribution systems may not provide. Distributed power generation technologies use a variety of fuels including natural gas, diesel, biomass-derived fuels, fuel oil, propane, and hydrogen. Fuel sources are also often based on renewable energy sources such as photovoltaic, wind and micro hydro, thereby reducing the environmental impact of a distributed power generation system. By using smaller, more fuel-flexible systems near the energy consumer, distributed generation avoids transmission and distribution power losses, and provides a wider choice of energy systems to the utility customer. Distributed power generation typically offers reliable, cost-effective, high-quality power during peak demand periods and can be a viable alterative to central station generated power. Also, many distributed power systems produce such low noise and emissions that they can be located near the buildings or infrastructure where power is needed, thereby simplifying the problems of conventional distribution infrastructure development.

Characteristic power transmission and distribution grids transmit electrical energy from generating facilities to end users. Multiple distributed generation systems may be interconnected to form an electrical grid. It may be noted that the electrical grid may include conventional generation and distribution networks as well. The resources of distributed generation systems may be brought on-line to supplement the electrical grid either at the utility's behest, or by an owner of the generated power in an effort to sell electricity.

Figure 1:
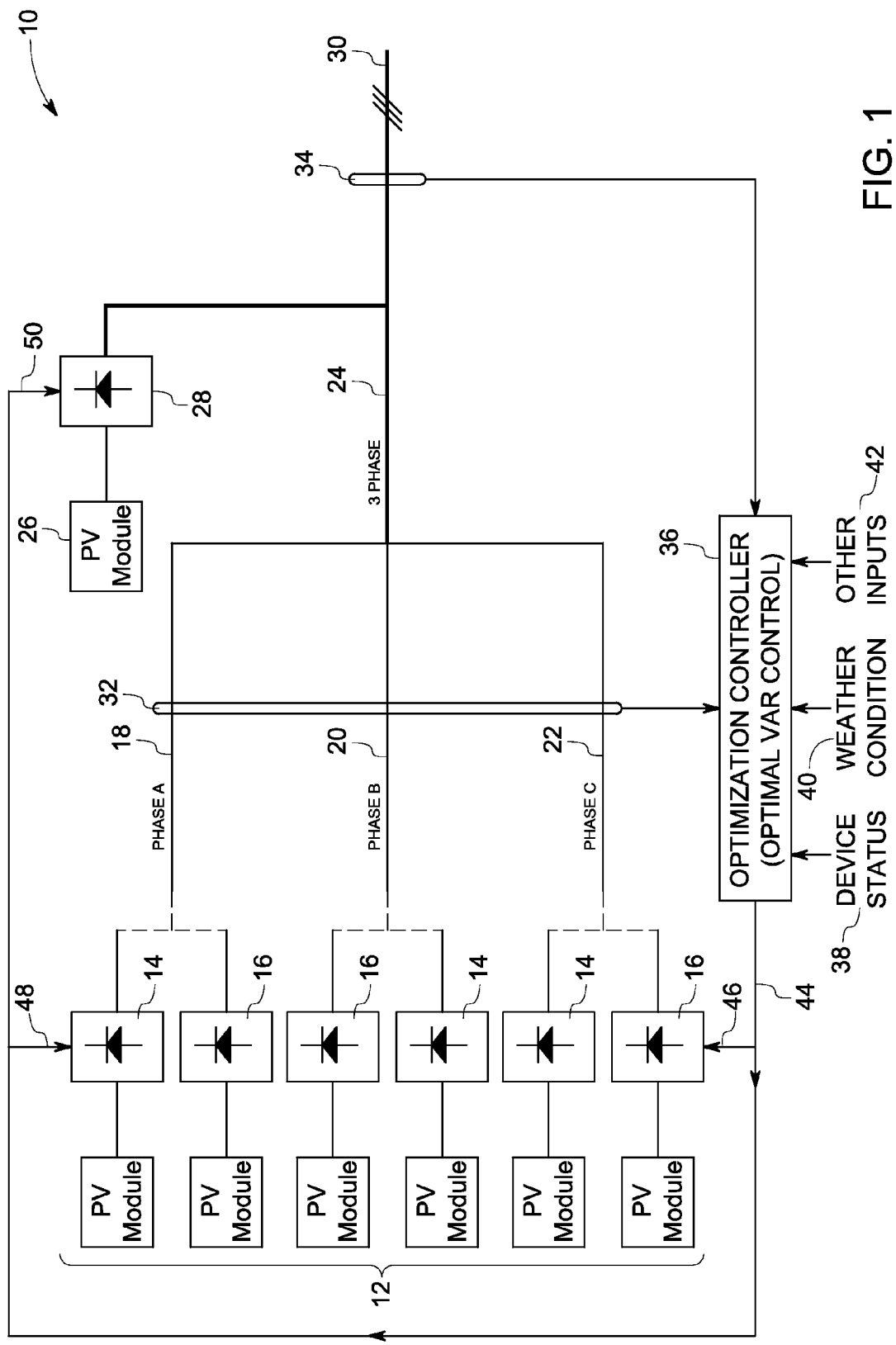
FIG. 1 is a block diagram representation of a distributed solar power generation system including a photovoltaic module according to an aspect of the invention.

Photovoltaic modules may include multiple photovoltaic arrays. Photovoltaic modules may further include an interconnected assembly of photovoltaic cells. Since photovoltaic cells typically require protection from the environment, multiple photovoltaic cells may be connected electrically and packaged in a single module. Many such modules may be fastened together, electrically wired, and operate as one unit. A photovoltaic installation typically includes an array of photovoltaic modules, an inverter, batteries and interconnection wiring. FIG. 1 illustrates one embodiment of a distributed solar power generation system according to an aspect of the present technique. The distributed solar power generation system (hereafter referred as "DSPGS") as represented by reference numeral 10 includes multiple photovoltaic modules 12, with each photovoltaic module being coupled to at least one or more inverters 14 and 16.

In an exemplary embodiment, the inverters 14 and 16 may be coupled together to form one phase of the DSPGS. In the illustrated embodiment, the inverters 14 and 16 are coupled together to form a first phase A (18), a second phase B (20), and a third phase C (22). Three such phases having connections from 18, 20, and 22 may be coupled together at node 24. Furthermore, additional single or three-phase systems including photovoltaic modules 26 and inverters 28 may be coupled together at node 24. In turn, the DSPGS 10 may be coupled to a utility or a conventional grid indicated by reference numeral 30.

In one embodiment of the invention, the DSPGS 10 includes multiple sensing devices such as sensing device 32 and sensing device 34 configured to sense network parameters such as, but not limited to current, voltage, real power, and reactive power. Examples of sensing devices 32 and 34 include a current measuring device, a voltage measuring device, a phase angle measuring circuit, and a power meter. In one embodiment, the sensing device 32 may be a current transformer configured to sense a load current from each phase. In another embodiment, the sensing device 34 may be a current transformer configured to sense overall load current from all three phases at node 24. Voltage measuring device circuits may be employed to sense voltage levels at various points in the grid. Increased demand typically results in reduced system voltage resulting in instability and/or trip off of the grid. In one embodiment of the invention, voltages are monitored to maintain certain minimum voltage requirements by the grid and to regulate demand. In another embodiment, the sensing device 32 may include a phase angle measuring circuit configured to measure a phase angle between phase current and phase voltage. In yet another embodiment, the sensing device 34 may include a phase angle measuring circuit to measure the phase angle between load voltage and load current. In another embodiment of the invention, the sensing device 32 and/or sensing device 34 may include a power meter configured to sense a reactive power measure in the grid.

In one embodiment of the invention, an optimization controller 36 is coupled to the grid and configured to receive various network parameters from sensing devices 32, and 34. The optimization controller 36 may also receive inputs such as a device status 38, a weather condition 40, and other inputs 42 further described in the following text. An example of the device status may include a sensed state of an inverter, state of the photovoltaic module or both. The sensed state may represent information such as online/offline, current capacity, and reactive power supplied. In an exemplary embodiment, a weather monitor may be configured to generate the weather condition 40 based on information such as rain and/or storm that may influence the photovoltaic module power out and outage in the grid. The optimization controller is further configured to produce and transmit a reactive power command 44 to each of the inverters as illustrated by reference numerals 46, 48, 50. It may be noted that, for sake of simplicity in illustration of the circuit diagram, coupling between the optimization controller and each of the inverters is not illustrated in detail. However, it may be appreciated that, the optimization controller 36 may be individually coupled to each of the inverters (14, 16, and 28). Further, inverters may include pulse width modulators and control circuitry configured to receive reactive power commands.

The optimization controller is also configured to receive other inputs 42 such as overall load demand monitored by a load demand monitor 34 and/or a grid condition monitor (not shown). For example, the grid condition monitor may provide parameters such as present power capacity, remaining power capacity, external voltage and frequency fluctuations, increase/decrease in load (or demand), real power supplied, and reactive power demand from the load. In one embodiment, the optimization controller receives various inputs and may execute an optimization algorithm to generate the reactive power command for use by the inverters. In one embodiment, the optimization controller is configured to balance multiple phase voltages and/or multiple phase currents that may occur due to unequal load across phases. A method for providing reactive power support by way of the reactive power command is described in detail and illustrated in FIG. 2

Figure 2:
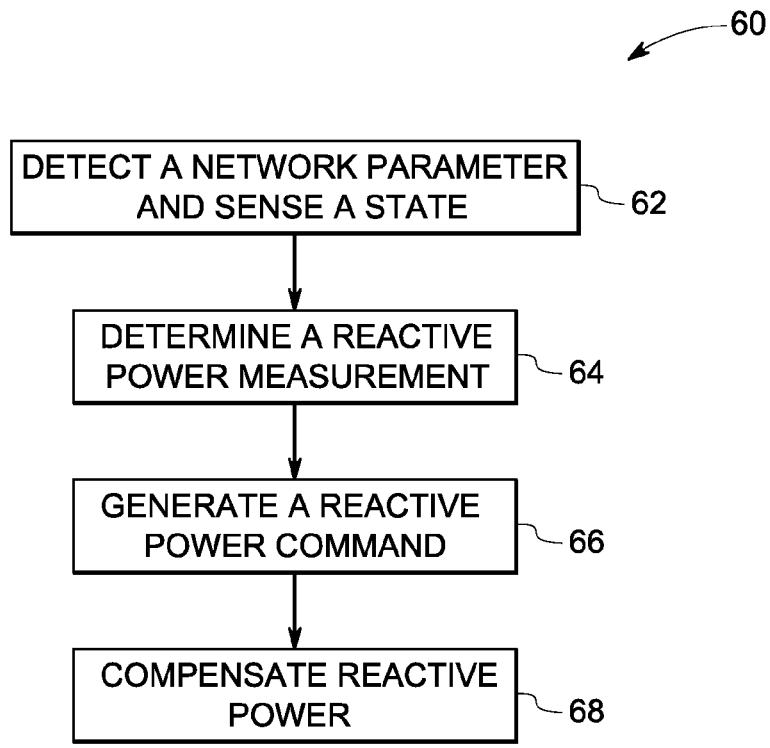
FIG. 2 is a flow chart of a method for compensating reactive power in accordance with one embodiment.

Turning now to FIG. 2, a method as illustrated by flow chart 60 includes various steps for compensation of reactive power as implemented in FIG. 1. In an exemplary embodiment, the optimization controller 36 of FIG. 1 implements the method 60. The method includes detecting at least one of a plurality of network parameters in the DSPGS comprising a plurality of photovoltaic modules coupled to a grid (block 62). The network parameters may include a current drawn by a load, voltage and/or frequency at various nodes in the grid, a state of the photovoltaic module, real power supplied by the inverter(s), reactive power drawn by the inverter(s), and a status of the inverters, photovoltaic modules or both, for example.

As was previously mentioned, the optimization controller 36 may be configured to receive signals from the various sensing devices coupled at various points across the grid and from individual photovoltaic modules and inverters. Sensing a state of the photovoltaic modules may include sensing information such as on/off status or operational state of the photovoltaic module, the inverters or both. Sensed state may also include reactive power support capability of the photovoltaic module, the inverters or both. Based on such inputs the optimization controller may calculate a reactive power measure that may indicate the reactive power supplied by each inverter (block 64). In one embodiment of the invention, the optimization controller is further configured to generate individual reactive power commands (block 66). Accordingly, based at least in part upon the reactive power command, reactive power compensation may be achieved (block 68). Additionally the optimization controller may facilitate minimization of system losses, optimization of system voltage distribution, and balancing the amount of reactive power fed into each of the phases in the DSPGS. The optimization controller may be configured to store information such as system topology and ratings of all the photovoltaic modules for present and future calculations of reactive power commands. The system topology for example, may include real time information such as network topology of the grid interconnect, load or demand delivery configuration.

Figure 3:
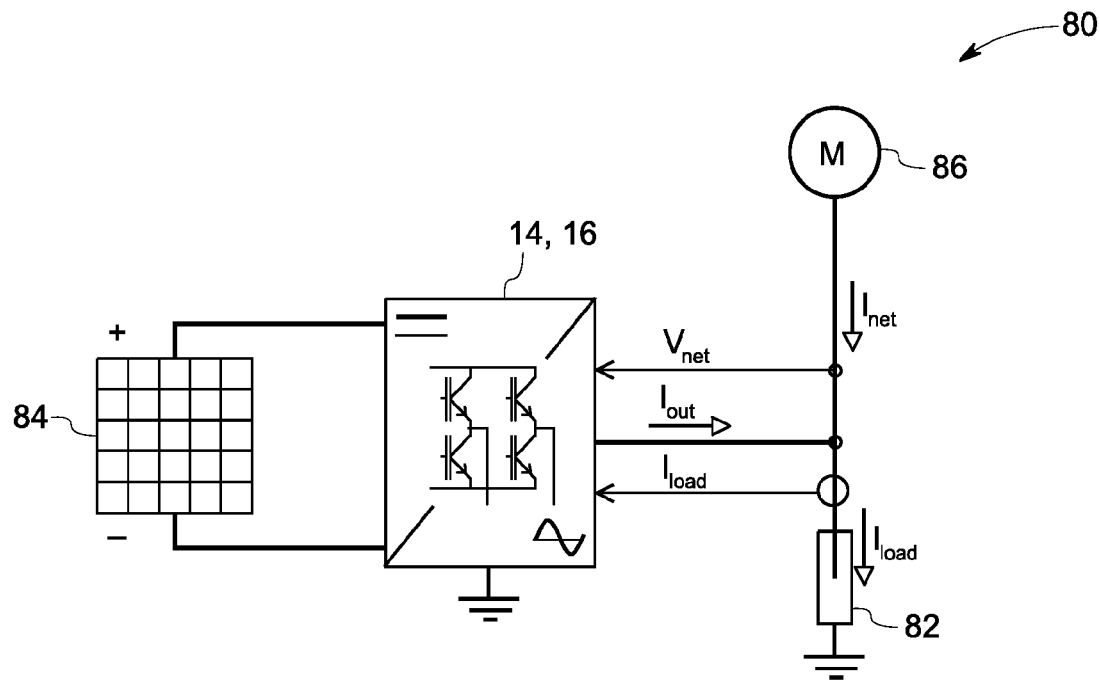
FIG. 3 is a schematic representation of the photovoltaic module in FIG. 1 coupled to a grid.

FIG. 3 is a block diagram illustrating an exemplary embodiment of a photovoltaic module 80 as implemented in FIG. 1. The photovoltaic module 80 may include an inverter 14 (or 16) coupled to a load 82 and a photovoltaic array 84 operating as a power source. The photovoltaic array may include solar cells capable of generating electricity. In operation, the photovoltaic array 84 coupled to the inverter 14 is configured to generate an output current $I_{out}$ for energizing the load 82 (driving a load current $I_{load}$) connected to a main grid 86 with a supply voltage $V_{net}$ driving a net current $I_{net}$.

Figure 4:
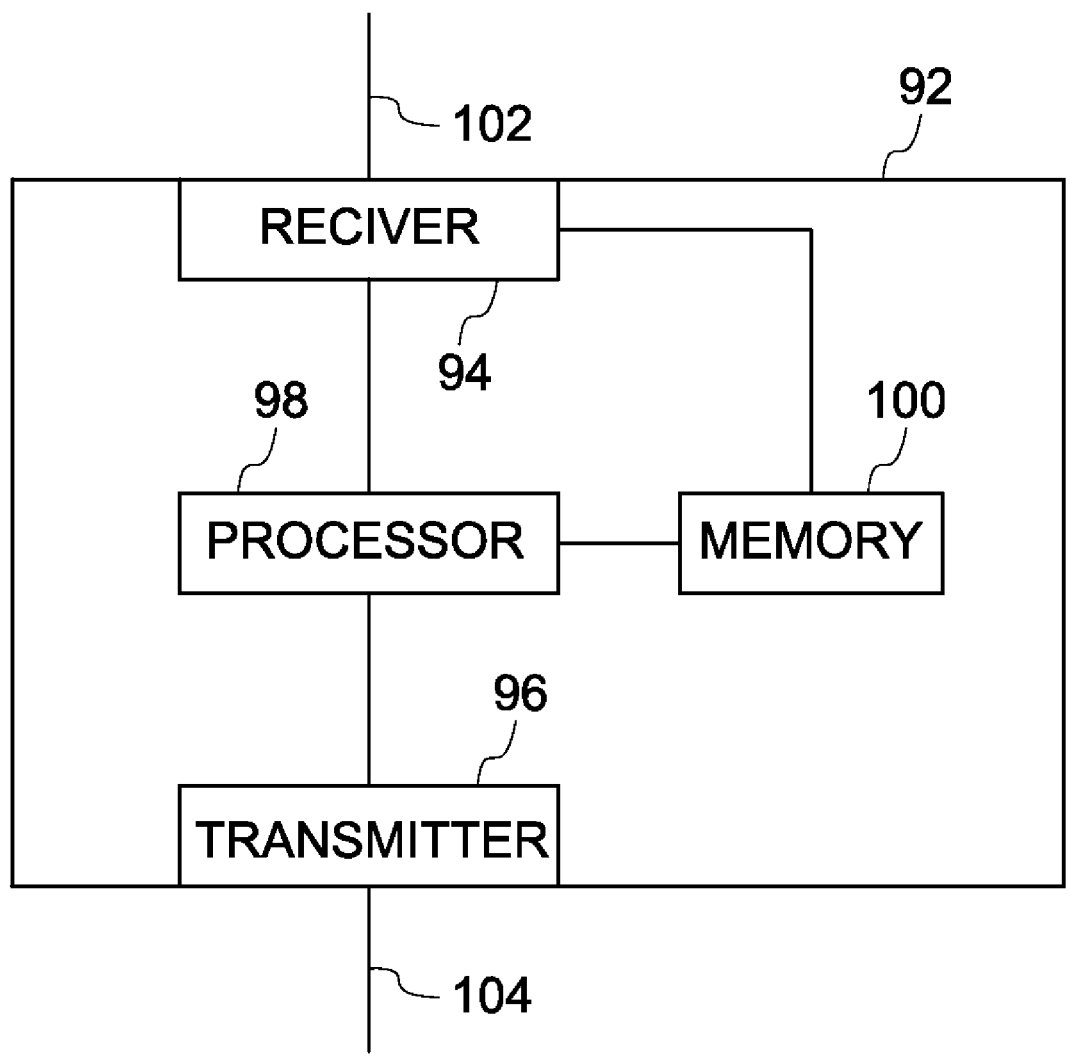
FIG. 4 illustrates a block diagram of a controller as implemented in FIG. 1.

FIG. 4 illustrates one embodiment of the optimization controller 92. In the illustrated embodiment, the optimization controller 92 includes a receiver 94, a processor 98, a memory 100, and a transmitter 96. The optimization controller also includes an input connection 102 coupled to the receiver and an output connection 104 coupled to the transmitter. The input connection 102 may be coupled externally to sensing devices for example. The receiver 94 may be configured to receive a plurality of network parameters and a status of photovoltaic modules, inverters or both via input connection 102 from the DSPGS coupled to the grid. In one embodiment, the receiver 94 may include one or more circuits such as analog to digital converter. In one embodiment, the memory 100 is coupled to the receiver 94 and the processor 98 and configured to store the plurality of network parameters and the status of the photovoltaic modules, inverters or both. In one embodiment, the status may include but not limited to on/off condition, reactive power capacity, and present load capacity of the photovoltaic modules, inverters or both. In one embodiment, the processor 98 is configured to compute reactive power measures for the DSPGS based upon the network parameters and the status. Based upon the reactive power measure, the processor is configured to generate a reactive power command. In an exemplary embodiment, the processor may be a digital signal processor capable of receiving digital inputs, to implement a pre-configured algorithm, and generate digital signals as output that can be used for action. The transmitter 96 coupled to the processor 98 is configured to transmit the reactive power command via output connection 104. The output connection 104 may be coupled externally to inverters to facilitate communication of the reactive power commands. The transmitter circuit, for example, may include one or more digital to analog converters. Furthermore, the transmitter circuit may be configured to interface with a communication network that includes a power line carrier or an Ethernet network. In one embodiment, the communication network may be configured to transmit the reactive power commands via the grid.

In one embodiment, the input connection 102 and output connection 104 may include an electrical network connection. The electrical network connection may facilitate transmission of analog signals and digital signals. However, based on design variations, analog to digital converters and digital to analog converters may be used before and/or after the input connection and/or output connection.

In operation, the optimization controller 92 is configured to receive multiple inputs via input connection 102 and generate reactive power commands used for compensation of reactive power in DSPSG. For example, multiple inputs may include network parameters such as current, voltage, and a real power measure from the grid. Multiple inputs to the controller 92 may also include a status of inverters that are coupled to the photovoltaic module. In an exemplary embodiment, the status may include an operating state of the inverters such as reactive power capability, current demand supplied, regulated voltage supplied at its terminals. Other parameters such as weather condition, system topology may be included within multiple inputs to the controller 92. The receiver 94 may be configured to convert the multiple analog inputs received by input connection 102 into digital signals. Processor 98 receives such digital signals and executes a method for optimizing reactive power and generates reactive power commands. The transmitter 96 may be configured to convert the reactive power commands into an analog signal. The analog signals may represent a command for a pulse width modulation controller of the inverter coupled to the photovoltaic module.

Advantageously, by implementing the optimization controller in a distributed power generation system, which is predominantly solar power generation, the intermittency issues that might aggravate the voltage regulation problem can be overcome. An added advantage is enabling a high reliability of solar power in the distributed power generation system. Such systems provide the ability to coordinate with other similar power converters and provide voltage regulation through a centralized controller. The optimization controllers are capable of generating individual reactive power commands for each inverter thereby minimizing system losses and optimizing system voltage distribution and balances the amount of reactive power.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of providing reactive power support comprising:

detecting at least one of a plurality of network parameters in a distributed solar power generation system comprising a plurality of photovoltaic modules coupled to a grid via inverters;

sensing a state of the photovoltaic modules coupled to the distributed solar power generation system;

obtaining data from at least one of a load demand module and a weather module;

determining a reactive power measure based upon the sensed state, the obtained data, and the detected network parameters;

generating a reactive power command based upon the determined reactive power measure; and compensating reactive power in the distributed solar power generation system based upon the generated reactive power command.

2. The method of claim 1, wherein the network parameters comprise at least one of a current, a voltage or a status of the inverters coupled to the distributed solar power generation system.

3. The method of claim 1 further comprising determining a system topology of the distributed solar power generation system.

4. The method of claim 3, wherein said sensing further comprises evaluating an operational state, reactive power capacity, and present load capacity of the photovoltaic modules.

5. The method of claim 1 further comprising activating the inverters coupled to the photovoltaic modules with the reactive power command to compensate reactive power in the distributed solar power generation system.

6. The method of claim 1, wherein the reactive power command is iteratively generated based upon the network parameters and the state of photovoltaic modules.

7. The method of claim 1 further comprising balancing multiple phase voltage, or balancing multiple phase current, or balancing multiple phase voltages and currents in the distributed solar power generation system.

8. A system comprising:
a plurality of photovoltaic modules coupled to a grid, wherein at least one inverter is coupled with the respective photovoltaic modules;
a plurality of sensing devices coupled to the grid and configured to sense at least one network parameter and a reactive power measure;
a load demand monitor; and
an optimization controller coupled to the at least one inverter and the load demand monitor and configured to generate a reactive power command for compensating reactive power in the distributed solar power generation system based upon the at least one network parameter, an output from the load demand monitor, and a sensed state.

9. The system of claim 8, wherein the sensing devices comprise at least one of a current measuring device, a voltage measuring device and a phase angle measuring device.

10. The system of claim 8, wherein the current measuring device is configured to sense a load current.

11. The system of claim 8, wherein the optimization controller is further coupled to a weather monitor.

12. The system of claim 8, wherein the optimization controller comprises an optimization algorithm to generate the reactive power command.

13. The system of claim 11, wherein the optimization controller is further configured to balance multiple phase voltages, or multiple phase currents, or both multiple phase voltages and currents in the grid.

14. An apparatus for optimizing reactive power compensation comprising:
a receiver configured to receive a plurality of network parameters, a weather condition, and a status of inverters coupled to a photovoltaic module in a distributed solar power generation system coupled to a grid;
a memory coupled to the receiver to store the plurality of network parameters, the weather condition, and the status;
at least one processor coupled to the receiver and configured to compute a reactive power measure for the distributed solar power generation system based upon the network parameters, the weather condition, and the status and to generate a reactive power command based upon the reactive power measure; and
a transmitter coupled to the processor and configured to transmit the reactive power command to the inverters to compensate reactive power in the distributed solar power generation system.

15. The apparatus of claim 14, wherein the receiver is further configured to digitize at least one of a current, a voltage, a real power, or a reactive power measure of the distributed solar power generation system.

16. The apparatus of claim 14, wherein the status comprises an operating state of the inverters coupled to the photovoltaic module.

17. The apparatus of claim 14, wherein the status further comprises a system topology.

18. The apparatus of claim 14, wherein at least processor executes an optimization algorithm to generate the reactive power command.

19. The apparatus of claim 14, wherein the transmitter is configured to interface with a communication network comprising a power line carrier or an Ethernet network.

20. The apparatus of claim 19, wherein the communication network is configured to transmit the reactive power command via the grid.

* * * * *